(12) United States Patent
Wunning

(10) Patent No.: US 7,166,139 B2
(45) Date of Patent: Jan. 23, 2007

(54) COMPACT STEAM REFORMER

(75) Inventor: Joachim A. Wunning, Leonberg (DE)

(73) Assignee: WS Reformer GmbH, Renningen (DE)

( * ) Notice: Subject to any disclaimer, the term of this patent is extended or adjusted under 35 U.S.C. 154(b) by 0 days.

(21) Appl. No.: 10/475,474

(22) PCT Filed: Apr. 9, 2002

(86) PCT No.: PCT/DE02/01285

§ 371 (c)(1),
(2), (4) Date: Apr. 26, 2004

(87) PCT Pub. No.: WO02/085781

PCT Pub. Date: Oct. 31, 2002

(65) Prior Publication Data

US 2004/0172877 A1    Sep. 9, 2004

(30) Foreign Application Priority Data

Apr. 19, 2001 (DE) ................... 101 19 083

(51) Int. Cl.
*B01J 7/00* (2006.01)
*B01J 8/00* (2006.01)
*B01J 8/02* (2006.01)

(52) U.S. Cl. ............... 48/214 R; 48/61; 48/127.9; 48/214 R; 48/214 A; 422/198; 422/203

(58) Field of Classification Search ............ 48/61, 48/62 R, 93–95, 127.9, 128, 198.1, 211, 193.7, 48/212, 214 R, 213, 214 A, 215; 165/165; 422/188–193, 198, 200, 203, 211, 222

See application file for complete search history.

(56) References Cited

U.S. PATENT DOCUMENTS

| 2,466,676 A | * | 4/1949 | Boling et al. ............. 62/399 |
| 4,861,348 A | | 8/1989 | Koyama et al. |
| 5,124,140 A | * | 6/1992 | Okada et al. .............. 423/650 |

FOREIGN PATENT DOCUMENTS

| EP | 0 435 642 A2 | 7/1991 |
| EP | 1 048 343 A2 | 11/2000 |
| GB | 3 153 382 A | 8/1985 |
| GB | 2 247 414 A | 3/1992 |
| JP | 54-11902 | 1/1979 |
| WO | WO 00/22690 A | 4/2000 |

* cited by examiner

*Primary Examiner*—Alexa D. Neckel
(74) *Attorney, Agent, or Firm*—Leydig, Voit & Mayer, Ltd.

(57) ABSTRACT

A reformer which enables rapid load changes of up to 100% within a few seconds and is intended to produce hydrogen from hydrocarbons by steam reformation, comprises an evaporator cooler for cooling the reformate and for generating steam. The evaporator cooler is disposed in the reformer, on the end of its reaction vessel. It keeps the applicable end of the tube cool and uses the waste heat of the reformate for generating steam. This makes fast load changes possible, because an increase in the introduction of water immediately causes an increase in the reformate produced and thus an increase in the heat output.

3 Claims, 7 Drawing Sheets

COMPACT STEAM REFORMER

This application is a national stage filing under 35 U.S.C. 371 of International Application No. PCT/DE02/01285, filed Apr. 9, 2002, and claims priority to German Application No. 10119083.2, filed Apr. 19, 2001.

FIELD OF THE INVENTION

The invention relates to a reformer for producing hydrogen and to a method for producing hydrogen from water and hydrocarbon compounds.

BACKGROUND OF THE INVENTION

For hydrogen generation, steam and a hydrocarbon compound ($C_xH_y$, organic compound, hydrocarbon mixture) are made to react at high temperature in a catalytic converter.

European Patent Disclosure EP 0 848 989 A2 discloses a co-current or countercurrent reactor which includes a monolithic element with many conduits parallel to one another, which are divided into two groups interested with one another. The reactants (educts) flow through one group, while a mixture of combustion gas and air flows through the other. If steam is among the reactants, then it must be generated separately.

U.S. Pat. No. 5,484,577 discloses a reformer with a combustion chamber that is heated via a gas burner. A substantially cylindrical reaction vessel is disposed in the combustion chamber, and its outer jacket is heated by the gas flame produced and by the hot combustion gases. Catalyst pellets are disposed in an outer ring region in the reaction vessel. The reaction gas mixture flows through the catalyst pellets and through a cylindrical return conduit to the gas outlet. The reactants are delivered in the form of gas or steam.

U.S. Pat. No. 5,811,065 also discloses a similar reformer which combines a plurality of reformers into a reformer battery.

In recent times, small reformer systems with a capacity of about 1 to 200 $Nm^3/h$ of hydrogen are needed for producing hydrogen as process gas or protective gas and to generate current using fuel cells. In such compact reformers, attempts to optimize the thermal economy are made in various ways.

The use of reformers to produce hydrogen for fuel cells, especially in small power plants with a capacity in the range from 5 kW to 20 kW, necessitates fast adaptation of the water production to load changes. The hydrogen yield should be equivalent to that of large systems. If natural gas is used as the starting gas, this means approximately 2.5 to 2.7 $m^3$ of hydrogen, per $m^2$ of natural gas. This is equivalent to an efficiency for energy conversion of 75 to 80%, in each case referred to the lower calorific value.

A need therefore remains for a reformer for producing hydrogen from hydrocarbons by steam reformation which is capable of handling rapid load changes within a short period of time and is capable of generating steam for the reformation process.

The invention provides such a reformer and a method for producing hydrogen from water and hydrocarbons via steam reformation. These and other advantages of the invention, as well as additional inventive features, will be apparent from the description of the invention provided herein.

BRIEF SUMMARY OF THE INVENTION

The reformer according to the invention generates hydrogen from water and methane or other hydrocarbons in the form of steam (gaseous state) at elevated temperature in a catalytic converter. For evaporating water, an evaporator cooler is provided. Water supplied is extensively evaporated in the evaporator cooler using the heat of the outflowing reaction products (reformate).

The flow rates of the products and educts are necessarily the same. Any change in evaporation output upon a load change causes a corresponding change in the flow rate of reformate and, correspondingly, the power input into the evaporator cooler changes. All the streams of material into the reaction vessel and out of it are always chronologically synchronous, and load-guided evaporation is thus made possible. The thermal inertia of the reaction vessel and the response time for the burners for varying the heating output does not have an inhibiting effect on the speed of load changes. On the contrary, upon a sudden change in load, the thermal inertia of the reaction vessel acts as a heat buffer, without which an especially fast load change is not even possible. Load changes of 100% can be attained within a few seconds.

The evaporation of the water and optionally of the fuel takes place at the inlet to the reformer, essentially by means of the reformate to be cooled down. Only a fraction of the requisite heat is drawn as needed from the exhaust gas of the burner, and as a result the evaporator temperature can be regulated.

The evaporator cooler preferably is provided as a split evaporator, in which the inlet conduit and the outlet conduit are helical split conduits. The inlet conduit preferably is positioned between the inside wall face of the reaction vessel and an insert body. The outlet conduit preferably leads along the inside wall face of the insert body. Water and fuel preferably are delivered into the common inlet conduit via capillaries. Thus, a mixture of water and fuel is evaporated. The fuel can be in gaseous or liquid form. Atomizer effects that occur reinforce the evaporation.

The reaction vessel is preferably constructed such that, even at high temperatures (for instance, up to 1000° C.), it is capable of withstanding high pressures (such as 10 or 20 bar). To that end, the reaction vessel preferably is a cylindrical pressure vessel. The reaction vessel enables the discharge of hydrogen under pressure for performing gas cleaning, for instance by a membrane process recompression can be dispensed with. Because of the lesser volume of the educts, the compression on the delivery side of the reformer can be achieved with substantially less compressor energy (by a factor of 5) than in the case of recompression downstream of the reformer.

The evaporator is heated primarily by the reformate. In addition, exhaust gas heating can be done through the wall of the reaction vessel. This makes it possible to regulate the evaporator temperature precisely. Preferably, over 90% of the evaporator output is supplied from the thermal energy of the reformats. Only some of the heat of evaporation is supplemented by thermal conduction of the reaction vessel and by a partial flow of exhaust gas. As a result, even upon startup of the system or during idling, the evaporator cooler can be kept at the desired temperature. To that end, a regulating device (temperature regulator) can be provided in a suitable conduit for a partial flow of exhaust gas extending, for instance, along the outside face of the reaction vessel. The efficiency of energy conversion is as high as 80% or more.

The heat exchanger is preferably disposed in the pressure vessel, so that virtually the same pressures prevail in both the inlet conduit and the outlet conduit. The heat exchanger is thus force-neutral.

The burner for heating the reaction vessel is preferably a burner that utilizes the exhaust gas heat, such as a recuperator burner or a regenerator burner. The burner can be regulated on the basis of the combustion chamber temperature. There is accordingly an automatic adaptation to the heat demand of the reformer at the time. Temporary differences between the heat demand and heat delivery are compensated for by the heat stored in the reformer.

The combustion chamber can be arranged for flameless oxidation. To that end, small-area eddies and circulations that could serve to develop and maintain flames are avoided. Low-$NO_x$ and low-wear operation thus results. Furthermore, fluctuations in the calorific value of the combustion gas are not critical.

In a preferred embodiment, one or more reaction vessels and one or more burners are disposed concentrically to one another. For instance, one centrally disposed burner is surrounded by a plurality of reaction vessels. Conversely, one reaction vessel can be surrounded by a plurality of burners or can receive them in a recess. In both cases, the reaction vessel or vessels and the burner or burners are introduced from one side into a preferably cylindrical chamber of the housing. This makes for a compact embodiment of the entire apparatus and makes simplified regulation possible. For instance, regulating the partial flows of exhaust gas for adaptation to different load situations can be dispensed with. Heat losses can also be reduced.

The reaction vessel can comprise (e.g., be constructed from) a ceramic, which still further increases the wear resistance to corrosion at high temperatures substantially. In a preferred embodiment, it has a narrower part protruding into the combustion chamber, in which part the actual reforming process takes place at between 700 and 1200° C. If needed, it can have a portion of greater diameter, which creates space for catalytic converters for the pre-reforming process (300 to 500° C.) for splitting or cracking long-chain $C_xH_y$ into $CH_4$ and receives the evaporator cooler. The evaporator cooler is preferably embodied annularly. A catalytic converter for performing a shift reaction or a membrane filter on the outlet side for trapping carbon monoxide can be disposed within the interior of the reaction vessel, which is at a temperature between 200 and 400° C.

The evaporator cooler enables fast, on-demand evaporation of the water and, optionally, fuel. Water, as long as it is liquid, keeps the evaporator below its pressure-dependent boiling temperature of 100 to 180° C. This, on the other hand, makes a shock-like cooling down of the reformate (quench cooling) possible. As a result, soot development, which occurs on surfaces at temperatures between 400 and 600° C., is strictly avoided.

Further details of advantageous embodiments of the invention are the subject of the drawings and the ensuing description.

DETAILED DESCRIPTION OF THE INVENTION

Figure 1:
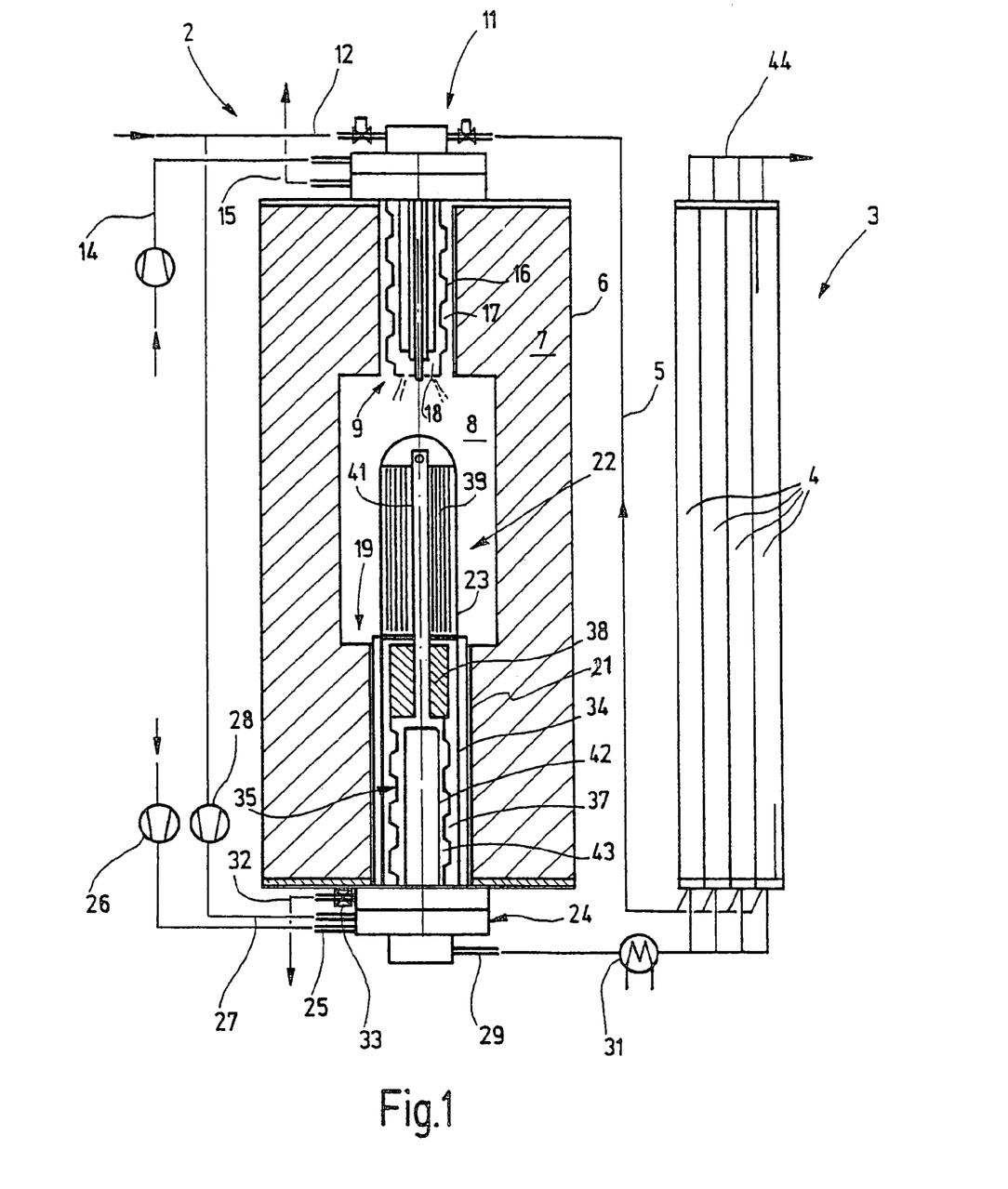
FIG. 1 is a sectional view of a reformer system with a reformer according to the invention.

Turning to the accompanying figures, FIG. 1 shows a reforming system 1 with a reformer 2 for generating hydrogen from fuel and water. The reformer 2 is followed downstream by a pressure swing adsorption system 3 (PSA) for separating out CO. The PSA 3 has a plurality of adsorption columns 4, through which the reformate periodically flows and is back-flushed. Residual gases are delivered to the reformer 2 via a line 5.

The reformer 2 has a housing 6, for instance, a cylindrical housing, with a heat insulation jacket 7. This jacket encloses a heating or combustion chamber 8, which for instance is cylindrical, on the face end 9 of which a burner 11 is disposed. The burner 11 is connected to the line 5 and to a fuel line 12. Via a line 14, air is delivered to the burner 11. Exhaust gases leave the burner 11 via an exhaust gas line 15. The burner 11 has a recuperator 16, which on the outside defines an annular exhaust gas conduit 17 and on the inside defines an air delivery conduit 18. The recuperator 16 serves to utilize the heat of the exhaust gas. This heat is transmitted to the incoming air and, optionally, to the fuel.

On the face end 19 of the combustion chamber 8 opposite the burner 11 (the lower face end), the insulating jacket 7 has a cylindrical passage 21, in which a chemical reactor 22 is disposed coaxially to the burner 11; this reactor protrudes into the combustion chamber 8. The reactor 22 has as its reaction vessel a tube 23 which is closed on one end and constructed, for example, of heat-resistant steel or some other suitable material, and whose closed end points toward the burner 11. In a departure from this, the burner 11 can instead be disposed at any suitable point of the combustion chamber 8.

The tube 23 is secured by its open end to a head 24, by way of which the educts are delivered and the products are carried away. This purpose is served by a line 25, which via a water pump 26 is acted upon by water at the desired pressure (such as 10 bar) and in the desired quantity, and by a line 27 for fuel. The line 27 communicates with the fuel line 12, and a fuel pump 28 serves to pump fuel into the reactor 22 in the desired quantity and at the desired pressure (10 bar). On the head 24, a reformate line 29 is provided, which leads to the PSA 3 via a reformate cooler 31. An exhaust gas 32 with a regulating valve 33 (such as a thermostat valve) is also provided on the head 24, and by way of it exhaust gas from the combustion chamber 8 can be carried as needed to the outside via an annular gap-like conduit 34 along the tube 23.

In the tube 23, immediately adjacent the head 24, there is an evaporator cooler 35 serving as an evaporator. It includes a tubular body 36, which is provided on its outside with one or more shallow thread courses and whose outside together with the inner wall of the tube 23 defines an inlet conduit 37. This inlet conduit carries the educts into a gap-like, helical conduit and then along the outer jacket face of an annular heat insulation element 38 into the reaction chamber of the reactor 22, in which there is a catalytic converter 39. The catalytic converter 39 fills the reaction chamber virtually completely. It has a central conduit, through which a collector tube 41 leads back to the evaporator cooler 35. The collector tube is provided, on its end protruding through the catalytic converter 39, with gas inlet openings and is otherwise closed. It discharges into the interior of the evaporator cooler 35, in which an insert body 42 is provided. The approximately cylindrical jacket face of the insert body, together with the inner wall of the evaporator cooler 35, defines a gap-like and, preferably, helically coiled outlet conduit 43, which leads to the reformate line 29.

The reforming system 1 described thus far is especially suitable for generating hydrogen in the range from 1 to 200 m³/h. The operation of the reforming system in generating hydrogen from water and hydrocarbons is described below.

In operation, the combustion chamber 8 is kept by the burner 11 at a temperature of 800° C. to 1200° C. The exhaust gases flowing out via the exhaust gas conduit 17 heat the combustion air, flowing in countercurrent to the exhaust gas via the air delivery conduit 18, up to 800° C., thus utilizing the exhaust gas heat. A flame can develop in the combustion chamber. If small-area eddies are avoided, flameless oxidation can also be achieved.

The end of the tube 23 protruding into the combustion chamber 8 and the catalytic converter 39 are thus heated to a temperature between 700° C. and 1200° C. The mixture of water ($H_2O$) and fuel ($CH_4$ or $C_xH_y$) flowing through here reacts predominantly to produce hydrogen, carbon monoxide, carbon dioxide, and water steam. Residues of the fuel can also still be contained in the reformate, which is now carried through the collector tube 41, through a central opening in the heat insulation element 38, to the evaporator cooler 35. The reformate arrives there essentially still uncooled, that is, at the same temperature at which it left the catalytic converter 39 (that is, markedly above 600° C.). At this temperature, it enters the outlet conduit 43. Because the evaporator cooler 35 is kept in its entirety at a temperature of about 200° C. by the liquid water (which at 10 bar does not boil until 180° C.) flowing through the inlet conduit 37, the reformate entering the outlet conduit 43 experiences shock cooling (quench cooling). It passes through the temperature range from 500 to 600° C. very quickly, so that virtually no soot formation from decomposition of CO occurs. Its thermal content is utilized for countercurrent water evaporation. The cooled reformate leaves the reactor 22 via the reformate line, is cooled down further somewhat in the reformate cooler 31 for water separation, and at the reactor pressure of about 10 bar enters the respective adsorption columns 4 that have been switched to be active. If such a column is saturated with the remaining carbon monoxide, it is back-flushed. In this way, the CO is carried via the line 5 to the burner 11. This process is known as pressure change absorption. Cleaned hydrogen leaves the reforming system 1 via an outlet line 44.

Sudden changes in the need for hydrogen necessitate a sudden change in the pumping by the water pump 26 and the fuel pump 28. As a result, the flow rate both into the inlet conduit 37 and into the outlet conduit 43 are changed, in accordance with the load change. As a result of the change in throughput in the outlet conduit 43, the evaporator output is immediately adapted in the inlet conduit 37. The steam generation thus responds without delay to the altered demand for steam. Conversely, the regulation of the burner 11 can be substantially slower without impairing the capacity of the reforming system 1. It suffices for the burner 11 to be regulated such that the combustion chamber 8 is kept at an adequately high (constant) temperature.

The water (and liquid fuel if applicable) is evaporated in the inlet conduit 37 countercurrent to the out-flowing reformate. The cold water in the inlet conduit also directly cools the tube 23 and thus avoids heat conduction losses. The thermal content of the reformate provides the great majority of the heat flow required for water evaporation.

For instance, the balance is as follows:

| | |
|---|---|
| 1 Nm³/h $CH_4$; 20 → 200° C.: | −0.088 kW |
| 1.6 kg/h $H_2O$; 20 → 200° C. (includes evaporation) | −1.237 kW |
| | −1.325 kW |
| 5 Nm³/h reformate, 900 → −300° C. | +1.237 kW |

The missing amount of 0.088 kW (approximately 7%) is partly compensated for by thermal conduction in the reformer tube and by a lesser partial flow of exhaust gas from the heating chamber.

The partial flow of exhaust gas is regulated for instance by a thermostat valve in the exhaust gas line 32. The partial flow of exhaust gas has significance particularly for starting up the reforming system 1. Upon startup, the exhaust gas furnishes the requisite evaporation energy for the water, as long as a sufficient reformate flow is present. After that, the exhaust gas leaves the combustion chamber 8 predominantly through the exhaust gas conduit 17.

Figure 2:
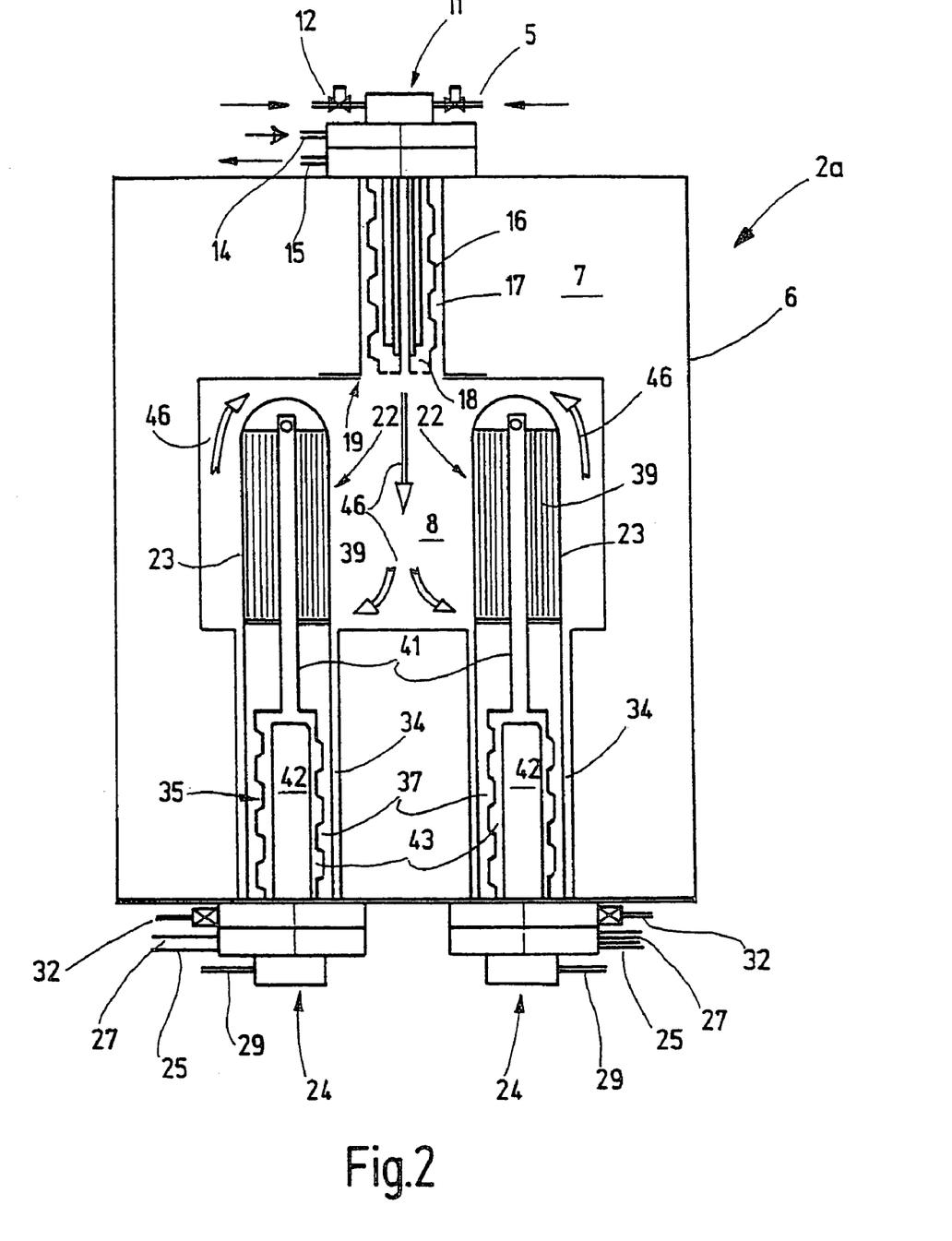
FIG. 2 is a sectional view of a reformer system with a reformer according to the invention comprising two reactors.

In FIG. 2, a modified embodiment of the invention is illustrated. To the extent that it matches the reforming system 1 described above, reference is made to the above description, using the same reference numerals. The reformer 2a shown in FIG. 2 has an enlarged combustion chamber 8, into which a plurality of reactors 22 protrude and are arranged, for example, in a circle that is concentric with the burner 11. Each reactor 22 has its own evaporator; in this respect, it is a complete unit by itself. These units function as described above. The reforming system 1 is constructed in modular fashion. Combining a plurality of reactors 22 into a reactor battery opens up the possibility of covering a broad capacity spectrum, using uniform reactors 22, by suitable adaptation of their number (building-block principle). The design of the combustion chamber, as indicated by arrows 46 in FIG. 2, makes it possible to achieve large-area recirculation, so that heat generation by flameless oxidation is made possible.

Figure 3:
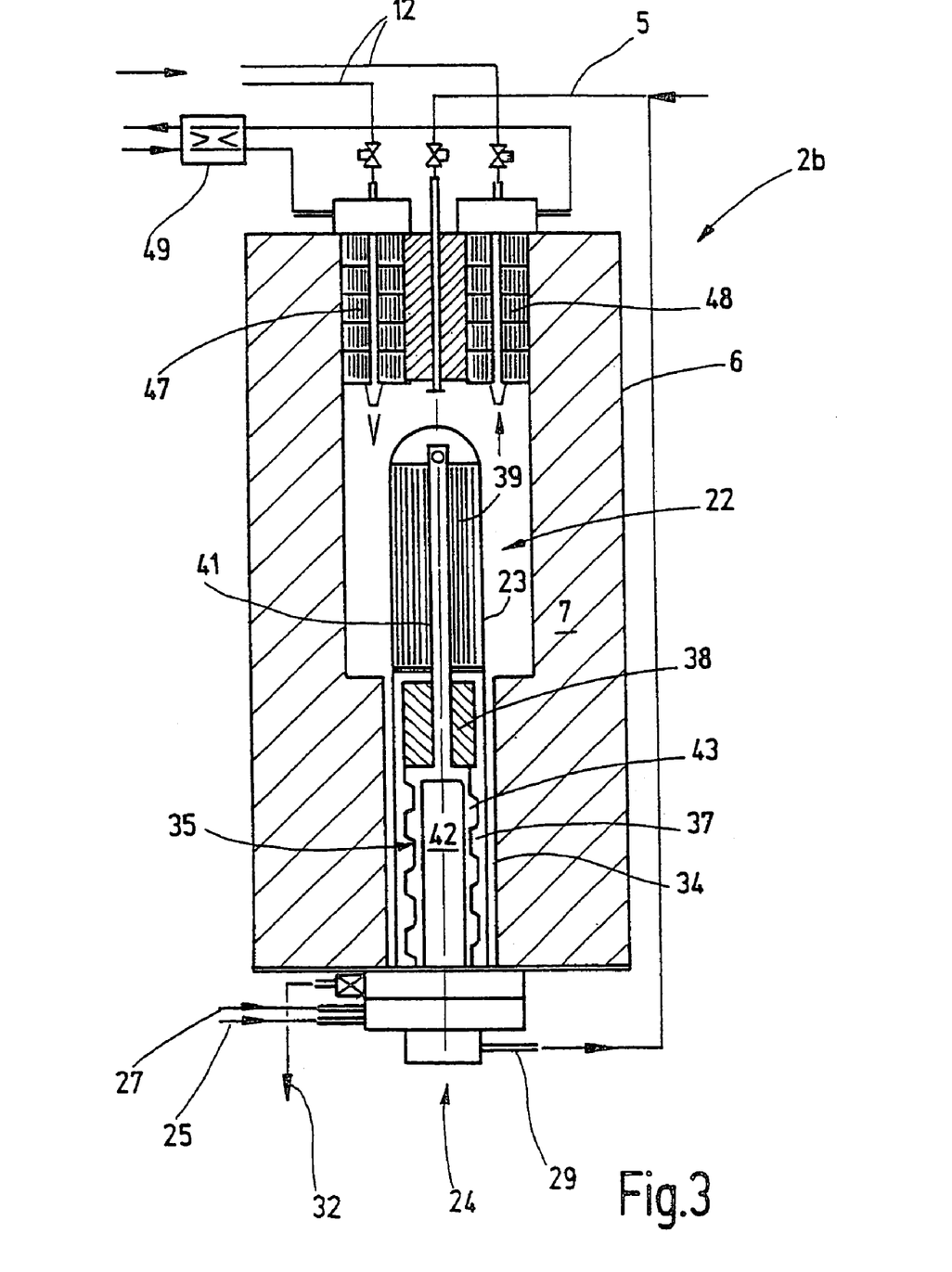
FIG. 3 is a sectional view of a modified embodiment of a reformer according to the invention with heating by regenerative burners.

As FIG. 3 also shows, the burner 11 can alternatively be designed as a regenerative burner. In an otherwise identical embodiment, this reformer 2b has two regenerators 47, 48, through which exhaust gas and air separately flow. The control is performed by an exhaust gas-air switchover valve 49. In the starting mode, the fuel is delivered via fuel lines 12, which lead through the regenerators 47, 48. The residual gas is fed directly into the combustion chamber 8 via the line 5 and oxidizes without a flame. The reformer 2b makes especially good utilization of the fuel energy possible.

Figure 4:
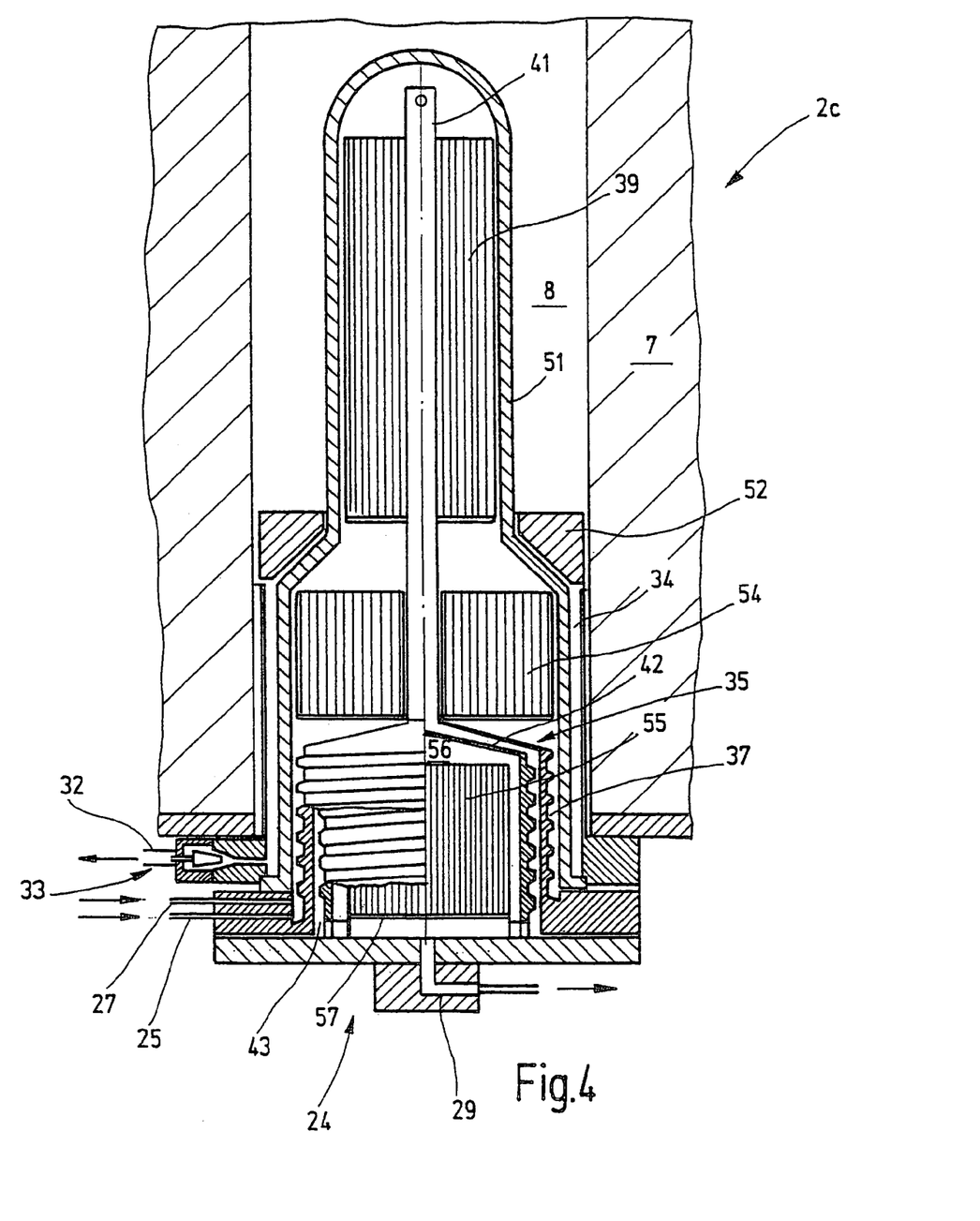
FIG. 4 is a sectional view of a reformer according to the invention with a ceramic reformer tube and a shift reactor.

It is also possible, instead of the tube 23, to provide a reformer tube (e.g., a cylindrical ceramic reformer tube). It can also take the form of the reformer tube 51 (see reformer 2c in FIG. 4, with a metal or ceramic tube). The preference for ceramic is because of its high wear resistance at high temperature. As FIG. 4 shows, an upper portion, containing the catalytic converter 39, can have a lesser diameter than the rest of the reformer tube 51. Only the narrower portion is exposed to the direct heating. A heat shield 52 is disposed in a conical transitional region of the reformer tube 51, to prevent uncontrolled heating of the remainder. The heat shield 52 is a heat-insulating ring, which, with the reformer tube 51, encloses a split conduit. The split conduit changes over into the annular gap-like conduit 34, which leads to the thermostat regulator 33.

In the widened portion of the reformer tube 51, a pre-reforming catalytic converter can be disposed immediately above the evaporator cooler 35; it can serve to split longer-chain hydrocarbons into methane in the temperature range from 300° C. to 500° C. Thus, the reformer 2c is especially suitable for liquid hydrocarbons, which are delivered via a capillary conduit (line 27). Also, as in all the embodiments, water (line 25) is sprayed into the common inlet conduit 37 via a capillary conduit, so as to be evaporated in the inlet conduit jointly with the fuel.

The reformer 2c additionally includes a shift catalytic converter 55, which serves the purpose of post-oxidation of carbon monoxide and water to form carbon dioxide and hydrogen. The shift catalytic converter 55 is disposed in an inner chamber 56 enclosed by the insert body 42. This chamber communicates directly with the outlet conduit 43. The shift catalytic converter is housed in a sleeve having a perforated bottom 57 so that the reformate is compelled to flow through it.

The reformer tube 51 is retained on the head 24 with an annular flange. As a consequence of the cooling by the inflowing water, this flange is relatively cool. Elastic seals can be employed.

Figure 5:
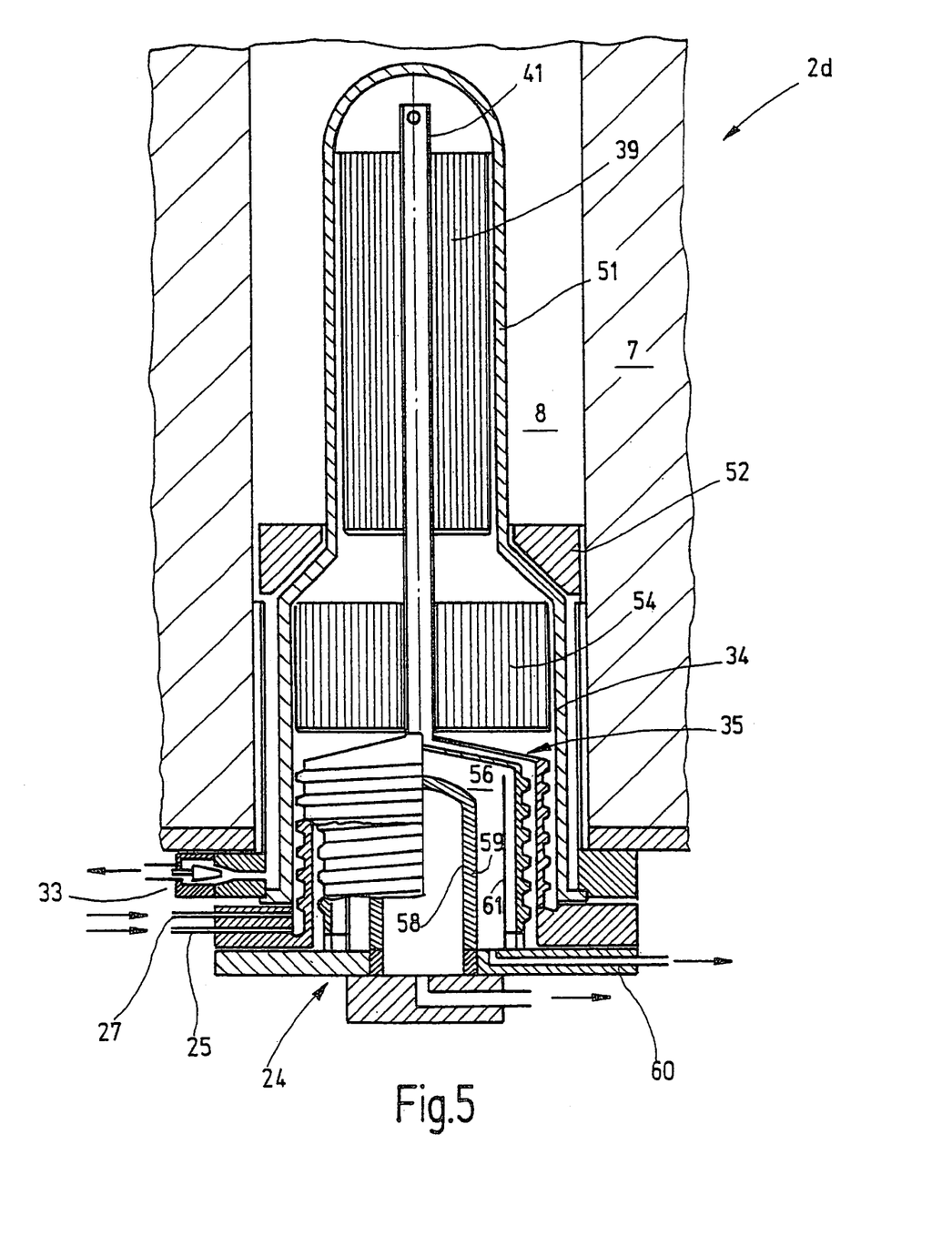
FIG. 5 is a sectional view of a reformer according to the invention with a ceramic reformer tube and a separation membrane body.

Instead of the shift catalytic converter 55, it is possible, as shown in FIG. 5, in a corresponding reformer 2d, for a separation membrane 59 (palladium-silver) to be provided, retained on one or more support tubes 58. This membrane can serve to separate out CO, and here it finds the appropriate temperature. Residual gas is removed from the inner chamber 56 through a separate residual gas conduit 60 and is returned for instance to the burner 11 again. The residual gas conduit is disposed at the base of the separation membrane 59. For preventing the reformate from flowing into the residual gas conduit 60, a tubular sleeve 61 is provided, which, like the separation membrane 59, protrudes upward from the bottom of the head 24 and, together with the separation membrane 59, defines an annular gap.

Figures 6, 7:
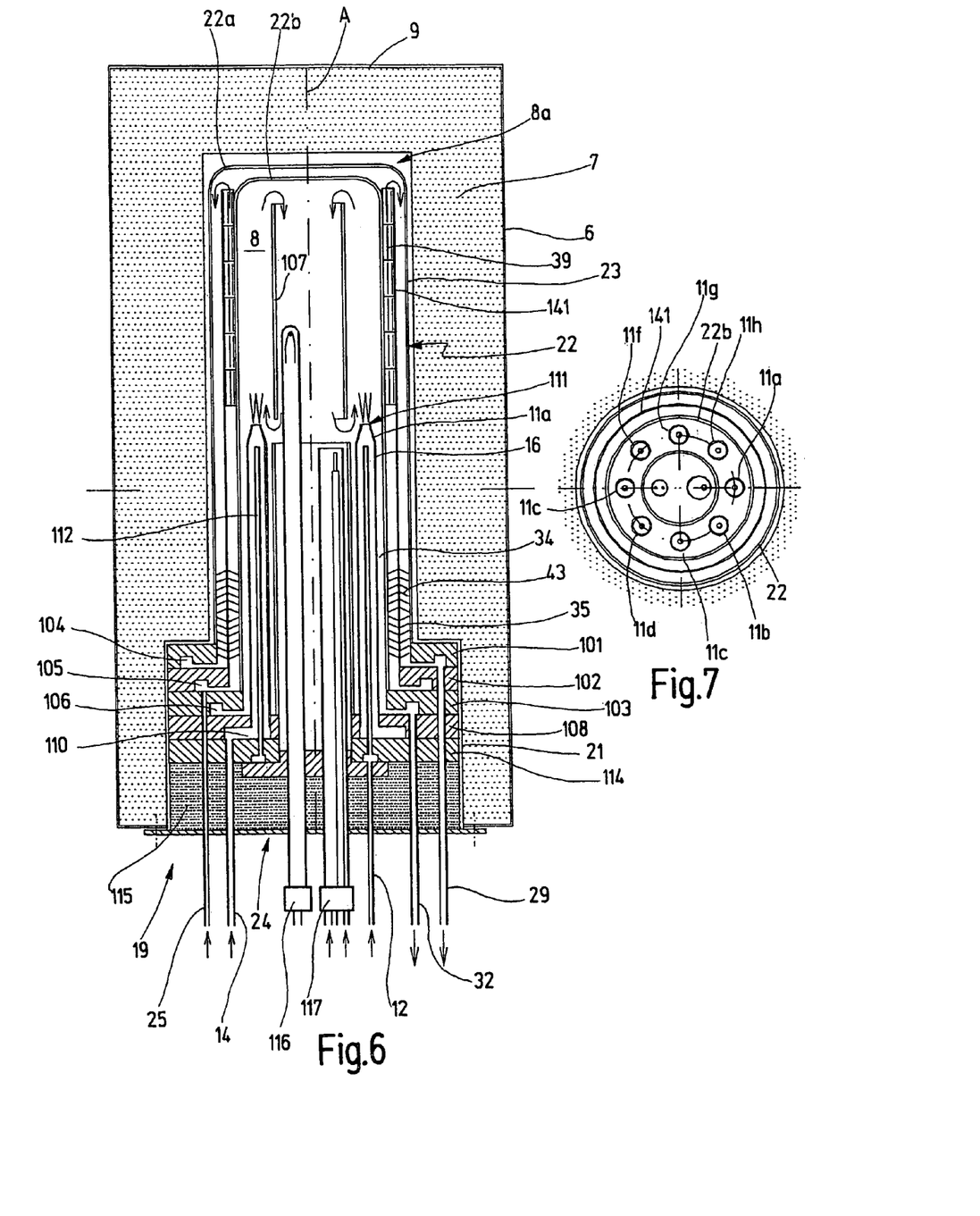
FIG. 6 is a sectional view of a modified embodiment of a reformer according to the invention.
FIG. 7 is a cross-sectional view of the reformer depicted in FIG. 6 along center axis A.

A further embodiment of the invention is shown in FIGS. 6 and 7. The description provided for FIG. 1 above applies accordingly in terms of the same reference numerals. However, the reformer 2 of FIG. 6 differs from the reformer of FIG. 1 as follows:

At the face end 19 of the combustion chamber 8, the insulating jacket 7 comprises a passage 21, through which both the reactor 22 and burners 11a–11h (FIG. 7), which form a burner group 111, protrude into the interior of the insulating jacket 7. The reactor 22 is provided as a double-walled, cup-shaped vessel with an outer wall 22a and an inner wall 22b, which are disposed concentrically to one another. The space between the two cup-shaped walls 22a, 22b forms the reactor interior. This interior is divided into an annular inflow conduit (inside) and an annular outflow conduit (outside) by a tubular wall 141, which is seated concentrically between the outer wall 22a and the inner wall 22b and which extends over virtually the entire cylindrical length of the reactor 22. The catalytic converter 39 is seated between the inner wall 22b and the wall 141. The wall 141 forms a heat exchanger wall, at which the products and educts exchange heat in countercurrent.

The outer wall 22a, the inner wall 22b, and the wall 141 are secured to retaining rings 101, 102, 103, which rest on one another and are stacked axially one above the other. Each retaining ring 101, 102, 103 is provided with an annular groove 104, 105, 106, which serves as a fluid conduit and communicates via a gap with the respective internal volume connected to it. To that end, each retaining ring 101, 102, 103 is higher in the axial direction on the outside than on the inside. The reformate line 29 leads into the annular groove 104. The line 25 leads into the annular groove 105, and the exhaust gas line 32 leads into the annular groove 106. This last groove communicates with the interior that is enclosed by the cup-shaped inner wall 22b. This interior at the same time forms the combustion chamber 8, in which the burners 11a–11h are disposed concentrically to a longitudinal center axis A. A guide tube 107 is disposed in the combustion chamber 8, and its diameter is less than the diameter along which the burners 11a–11h are disposed. This forces a large-area recirculation flow to occur in the combustion chamber 8, for the sake of enabling flameless oxidation.

The burners 11a–11h preferably are identical to one another. They each have a recuperator tube 109, which tapers toward its orifice and is retained on its end on a retaining ring 108, and whose internal conduit is connected, via an annular groove 110, to the line 14 for delivering air and brings about the heat exchange between exhaust gases and fresh air in countercurrent. On the inside, each recuperator tube 109 encloses a fuel delivery tube 112. This tube is secured in a retaining ring 114, which forms a stack with the other retaining rings 101, 102, 103, 108. Toward the outside, the stack is covered by a relatively thick insulating disk 115. A temperature sensor 116 and an ignition burner 117 extend into the combustion chamber 8 through the insulating disk 15 and the stack of retaining rings.

The special feature of this embodiment is that the combustion chamber 8 is enclosed by the reactor 22. An inner chamber 8a enclosed by the insulating jacket 7 in turn encloses the reactor 22, but its wall does not have any direct contact with the hot combustion gases. The heat-insulating housing can thus be constructed economically. It has been demonstrated that this embodiment is advantageous especially at a very low reformer output, for instance of less than 1 Nm$^3$ of H$_2$/h. Experiments have shown that in this arrangement, regulating the partial flows of exhaust gas to supplement the evaporator output (see regulating valve 33 in FIG. 1) can be dispensed with.

Figures 8, 9:
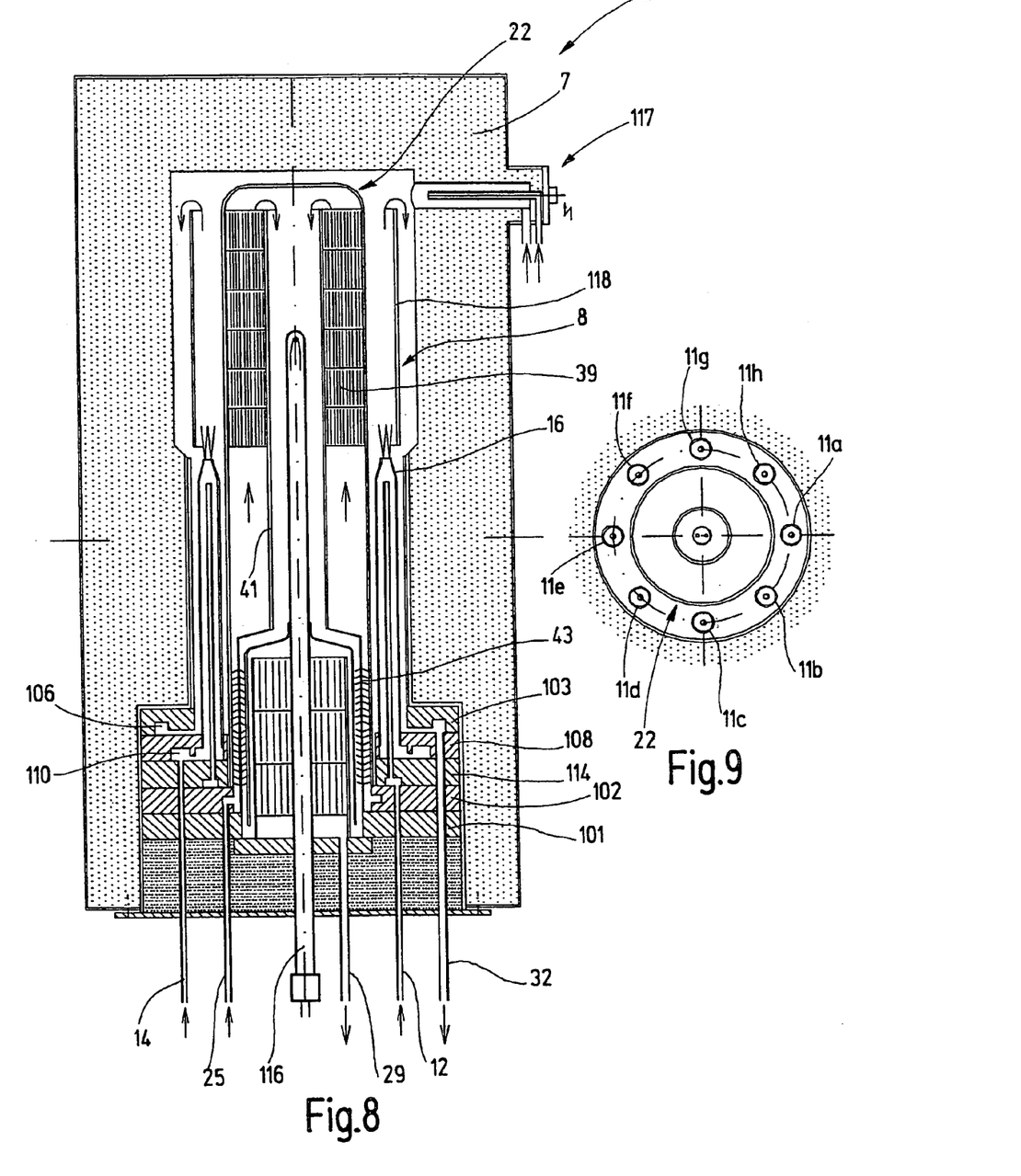
FIG. 8 is a sectional view of a further embodiment of the reformer according to the invention.
FIG. 9 is a cross-sectional view of the reformer depicted in FIG. 8.

A further embodiment of the reformer 2 of the invention is shown in FIGS. 8 and 9. While the reformer of FIG. 6 has internal heating, the reformer of FIG. 8 is provided with external heating. The reactor 22, which is constructed similarly to FIG. 1, is surrounded, as FIG. 9 particularly shows, by burners 11a–11h. These are constructed basically as in FIG. 6. Their recuperator tubes 16 end in a nozzle for generating a large-area recirculation flow. To carry this flow appropriately into the combustion chamber 8, a guide tube 118 is disposed in the combustion chamber, concentric with the reactor 22. Otherwise, with the same reference numerals, reference may be made to the various descriptions above. The ignition burner 117 is disposed laterally at a radial opening in the insulating jacket 7 and thus discharges radially into the combustion chamber 8.

This embodiment of the reformer 2 is likewise compact and especially suitable for small outputs. Regulation of a partial flow of exhaust gas that supplements the evaporator output can be dispensed with.

A reformer 2 which enables fast load changes of up to 100% within only a few seconds, and which is intended to produce hydrogen by steam reformation from hydrocarbons, has an evaporator cooler for cooling the reformate and for generating steam. The evaporator cooler 34 is disposed in the reformer 2, on the end of its reaction vessel. It keeps the applicable tube end cool and uses the reformate waste heat for generating steam. Fast load changes are also possible because an increase in the introduction of water immediately also causes an increase in the reformate produced and thus an increase in the heat output.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for producing hydrogen in a steam reforming process from water and a hydrocarbon compound, comprising the steps of heating water and a hydrocarbon compound with a recuperator or regenerator burner (16, 47, 48), reacting the water and the hydrocarbon compound to produce hydrogen and a reformate, evaporating the water prior to the step of heating the water with a recuperator or regenerator burner with greater than 90% of entrained heat in the reformate produced, and cooling said reformate at quench conditions to effectively transfer said entrained heat from the reformate to the water.

2. The method of claim 1, further comprising evaporating the hydrocarbon compound as a common stream of material with the water with effective simultaneous cooling of the reformate under countercurrent heat transfer conditions at an evaporative temperature of about 200 to 400° C.

3. A reformer (2) for producing hydrogen from a hydrocarbon compound and water, the reformer comprising
   a thermally insulated heating chamber (8),
   at least one heat source comprising a recuperator or regenerator burner (16, 47, 48) associated with the heating chamber (8),
   at least one reaction vessel (23) extending into the heating chamber (8),
   at least one inlet conduit (37) adapted to carry water, fuel, or a mixture thereof into the reaction vessel (23),
   at least one outlet conduit (43) adapted to carry a product produced in the reaction vessel out of the reaction vessel (23),
   an evaporator cooler (35),
   said inlet conduit (37) and outlet conduit (43) being separately connected to the evaporator cooler (35), and
   said evaporator cooler (35) having at least one heat transfer surface for quench cooling the product carried by the outlet conduit (43) and another heat transfer surface for counter-currently evaporating to the water, fuel, or mixture thereof carried by the inlet conduit (37), whereby said heat transfer surfaces are adapted to transfer at least 90% of the heat entrained in the product carried by the outlet conduit (43) to the water, fuel, or mixture carried by the inlet conduit (37).

* * * * *